3,478,232
SUPERCONDUCTIVE GENERATORS
Franz X. Eder, Munich, and Hans Voigt, Erlangen-Bruck, Germany, assignors to Siemens Aktiengesellschaft, Erlangen, Germany, a corporation of Germany
Filed Aug. 19, 1966, Ser. No. 573,623
Claims priority, application Germany, Aug. 21, 1965,
S 98,972
Int. Cl. H02k 1/00, 3/00
U.S. Cl. 310—10                                                 5 Claims

ABSTRACT OF THE DISCLOSURE

A superconductive generator has a superconductive sheet and a magnetic member coacting with the sheet for moving through the latter a region of normal electrical conductivity through which magnetic flux flows. A superconductive return conductor is located adjacent the sheet and coacts therewith during the operation of the generator for receiving a current which flows in a direction orientated oppositely to the direction of flow of current in the sheet so that transverse magnetic fields produced by the respective currents substantially cancel each other. A ferromagnetic member is situated in the vicinity of the return conductor for guiding the magnetic flux and for maintaining the magnetic flux at the location of the return conductor smaller than at the region of normal electrical conductivity of the superconductive sheet.

---

Our invention relates to superconductive generators.

In order to provide an electrical current in an electric circuit, particularly a superconducting electric circuit, with superconductive generators, also known as flux pumps, a superconductor in the form of a sheet which forms part of the electrical circuit has a region of normal electrical conductivity displaced therethrough while magnetic flux flows through this region of normal electrical conductivity. The superconductive sheet can, for example, take the form of a flat sheet or of a clindrical casing. This sheet can be made in a number of different ways. For example, it can simply be made of one body of sheet metal, or it can be made up of a plurality of thin superconductive layers. Also, the sheet can be composed of a plurality of wires or tapes which are connected in parallel and which are arranged so as to form a sheet structure. Thus, in the description and claims which follows, the term "sheet," and in particular the "superconductive sheet" referred to below, is intended to designate any of these constructions.

The region of normal electrical conductivity which is moved through the superconductive sheet is in general achieved by a limited magnetic field which extends substantially perpendicularly with respect to the superconductive sheet and which is greater than the critical magnetic field of the superconductive sheet. As a result of the action of this magnetic field, a limited region of normal electrical conductivity is provided in the superconductive sheet, and a magnetic flux flows through this limited region. The remainder of the superconductive sheet remains superconducting, so that no undesirable influences act on a current which is already flowing in the superconductor. The movement of the normally conducting region through the superconductive sheet can, for example, be provided by means of a moving permanent magnet or a moving electromagnet, or by way of a rotary magnetic field. The magnetic flux which moves through the superconductive sheet induces an electrical current in the circuit connected thereto. The primary features of the construction and operation of such a superconductive generator is described in an article in the journal "IEEE Spectrum," vol. 1, 1964, No. 12, pages 67–71. The superconductive generators are particularly suited for supplying current to the coils of superconductive magnets.

In order to concentrate as much magnetic flux as possible in a narrowly limited normally conductive region, the magnetic field which is produced in this region can be guided by a ferromagnetic material, particularly soft iron, in such a way that a closed magnetic circuit having at least one air gap is provided. The superconductive sheet is then situated in this air gap. The region of normal conductivity is situated at any given instant at the location of greatest magnetic field intensity.

When providing high currents with superconductive generators, which is to say particularly when the normally conductive region has already passed through the superconductive sheet a number of times and a relatively large current has been induced in the electrical circuit, the magnetic field which results from the induced current itself has a noticably undesirably influence on the generator. The induced current flows through the superconductive sheet primarily in a direction which is perpendicular to the direction of movement of the normally conductive region and perpendicularly to the direction of movement of the magnetic flux which flows through the normally conductive region, so that the induced current flows perpendicularly with respect to the resulting magnetic field. Therefore, the induced current builds a magnetic field whose field lines extend perpendicularly with respect to the direction of flow of the current and substantially perpendicularly to the magnetic field at the surfaces of the superconductive sheet, this latter magnetic field at the surfaces of the superconductive sheet being provided by the normally conductive rigion. Inasmuch as the magnetic field produced by the induced current is directed primarily transversely with respect to the magnetic field of the normally conducting region, this magnetic field resulting from the induced current is referred to below as a transverse magnetic field.

As a result of the influence of the transverse magnetic field which increases with the increasing current in the electric circuit, the magnetic field achieved by the normally conductive region becomes distorted. In particular, it is possible for a transverse magnetization of the rotary magnet or the ferromagnetic material which surrounds the air gap to take place. The distortion of the magnetic field leads to a distortion of the normally conductive region which flows through the superconductive sheet, as well as to a distortion of the magnetic flux of the latter region of normal conductivity. The result is that with an increasing number of passes of the normally conductive region through the superconductive sheet there will be a reduction in the current change induced in the electrical circuit at each pass, so that a saturation effect results. Moreover, the transverse magnetic field has an undesirable influence on the extent to which the superconductor can be loaded, this loading capability diminishing as the magnetic field increases at the location of the superconductor.

It is therefore a primary object of our invention to provide a superconductive generator with a construction which will avoid to a very great extent the undesirable influences of a transverse magnetic field.

Also, it is an object of our invention to provide a construction which will achieve this result while at the same time being relatively simple, compact, and efficient.

Thus, the superconductive generator of our invention has a superconductive sheet and a means for moving through the sheet a normally conductive region through which magnetic flux flows. The above-discussed problem is solved according to our invention by providing adjacent to the superconductive sheet a return conductor means which is superconducting during operation of the generator and which during operation of the generator has an electrical current which flows through the superconductive return conductor means in a direction which is oriented oppositely with respect to the current which flows in the superconductive sheet. As a result the magnetic transverse fields of these oppositely directed currents substantially cancel each other so that with the construction of our invention the undesirable influence of the transverse magnetic field is eliminated by providing a compensation therefor.

Our invention is illustrated by way of example in the accompanying drawings, which form part of this application, and in which:

FIG. 1 schematically illustrates the principle according to which compensation of the transverse magnetic fields is achieved with the superconductive generator of our invention;

Figure 1:
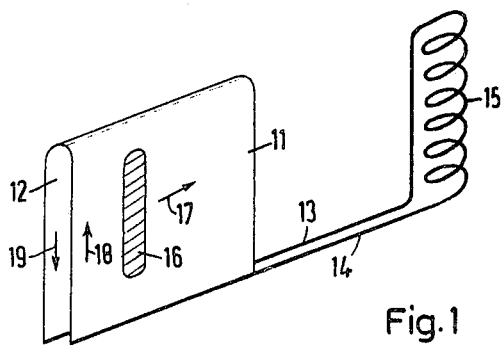
FIG. 1a is a schematic partly sectional illustration of the manner in which the structure of FIG. 1 can be housed and the manner in which it is possible to provide the moving region of normal conductivity.

Referring now to FIG. 1, the electrical circuit of the generator of our invention is schematically illustrated therein. The superconductive sheet 11, which may be made, for example, of niobium sheet, is connected with a return conductor means 12, also in the form of a sheet or plate and made, for example, of niobium-zirconium sheet. The circuit is completed by way of superconductive conductors 13 and 14, the superconducting conductor 13 being electrically connected with the return conductor means 12 while the conductor 14 is electrically connected with the superconductive sheet 11, and these superconducting conductors 13 and 14 are connected to a load 15 having, for example, the form of a superconductive coil. During operation of the generator, a magnet which is not illustrated in FIG. 1 is displaced with respect to the superconductive sheet 11 in order to move through the superconductive sheet 11 the normally conductive region 16 which moves in the direction of the arrow 17 and through which magnetic flux flows.

Figure 1A:
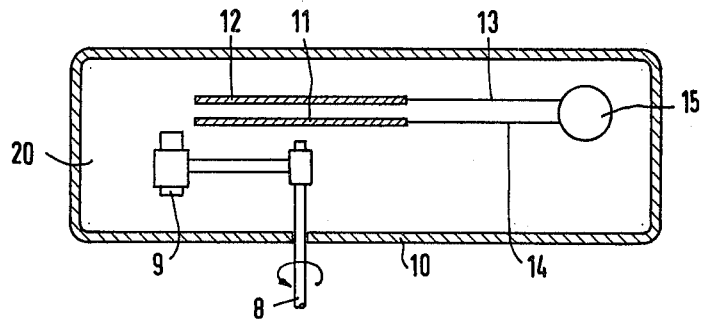

Referring to FIG. 1a, the above-described components of FIG. 1 are suitably housed in an enclosure 10 which is heat insulated and filled with a cryogenic medium 20, such as liquid or evaporating helium. A rotary shaft 8 extends through a suitable seal into the enclosure 10 and is driven at the exterior thereof in any suitable way. In the interior of the enclosure 10 the shaft 8 carries and rotates a permanent magnet 9. The shaft 8 is located beyond the sheet 11 so that at least one half of each revolution of the magnet 9 takes place beyond the sheet 11 and as a result when the magnet 9 is in the region of the sheet 11 it only moves with respect thereto through a maximum of one half of a revolution, thus causing the normally conductive region 16 to move at all times only in the direction of the arrow 17 of FIG. 1. Therefore, with this construction the rotary magnet 9 moves along the superconductor 11 always in the same general direction so as to displace the normally conductive region 16 in the direction of the arrow 17 with the magnetic flux flowing through the region 16.

Thus, the magnetic field produced in the superconductor 11 in this way extends within the region 16 substantially perpendicularly with respect to the exterior surface of the sheet 11. Inasmuch as the plate or sheet which forms the return conductor 12 is not normally conducting, the magnetic flux which flows through the normally conductive region is directed into the electrical circuit and induces an electrical current in this circuit. The induced current flows through the superconductive sheet 11 in the direction of the arrow 18 and through the return conductor means 12 in an oppositely oriented direction, which is to say in the direction of the arrow 19 shown in FIG. 1. Since the electrical current flowing in the direction of the arrow 18 produces a magnetic field which circulate about the superconductors 11 and 12 in a direction which is opposite in the direction of circulation of the magnetic field resulting from the current flows in the direction of the arrow 19, both of these fields substantially cancel each other in the region surrounding the superconductors of sheet or plate configuration. In particular, there is no undesirable transverse magnetic field at the location of the magnetic pole which produces the normally conductive region 16.

Figure 2:
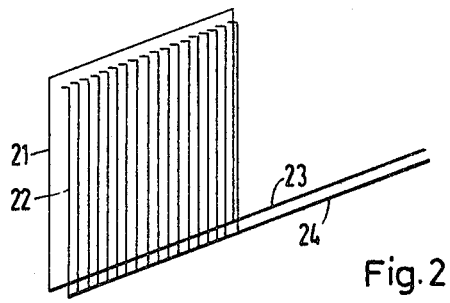
FIG. 2 is a schematic illustration of one possible embodiment of a superconductive sheet of a generator of our invention provided with a superconductive return conductor means.

In the embodiment shown in FIG. 2, the superconductor through which the normally conductive region is moved takes the form of a sheet 21 of a superconductive material such as niobium, for example. The return conductor means of this embodiment is formed by a relatively large number of wires 22 made of a superconductive material of a higher critical magnetic field, such as, for example, niobium-zirconium. These wires 22 are connected to the sheet 21 beneath an edge thereof which extends parallel to the direction of movement of the normal conducting region, these wires 22 being parallel to each other as well as extending perpendicularly with respect to the direction of movement of the normally conductive region at a small distance from and extending along one side of the sheet 21. The free ends of the wires 22 are electrically connected with a bus bar 24 which is connected to the load. The sheet 21 is connected by way of a superconductor 23 with the load. As compared with a return conductor means in the form of a sheet or plate, the return conductor means made up of a plurality of individual wires presents the advantage of permitting the magnetic flux which flows through the normally conducting region in the superconductor 21 to flow without hindrance through the spaces between the wires 22, so that the magnetic flux remains narrowly concentrated. Therefore, this embodiment is particularly suitable for a return conductor means to be arranged in an air gap of a magnetic circuit.

Figure 3:
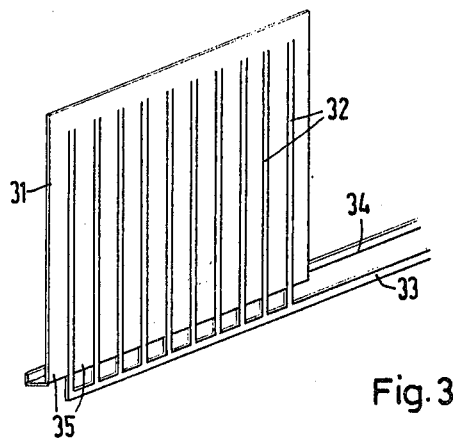
FIG. 3 shows a further embodiment of a superconductive sheet of a generator of our invention provided with a superconductive return conductor means.

In the embodiment of FIG. 3, the superconductive sheet together with the superconductive return conductor means takes the form of a superconductor made of a sheet or plate 31 of superconductive material formed with elongated parallel slots which extend perpendicularly with respect to the direction of movement of the normally conductive region. Within these slots of the superconductive sheet 31 are situated the return conductors 32 made of the superconductive material having a higher critical magnetic field, so that these return conductors 32 are also parallel to each other and extend perpendicularly with respect to the direction of movement of the normally conductive field, while in this embodiment the return conductors 32 are situated in the same plane as the sheet 31. The plurality of return conductors 32 extend beyond the sheet or plate 31, at the lower side thereof, as viewed in FIG. 3, and all of these conductors 32 are electrically connected with a bus bar 33 which is superconductive and which is connected to the load. The slots which are formed in the sheet 31 provide the latter with the elongated plate portions 35 which are respectively separated from each other by the slots in which the return conductors 32 are located, and all of these plate portions 35 of the superconductive sheet 31 are connected with a bus bar 34 which extends laterally from the lower ends of these plate portions 35, as viewed in FIG. 3. Of course, the bus bar 34 is also connected to the load. Inasmuch as with this embodiment the inducted current in the plate portions 35 and the return conductors 32 flows in oppositely oriented directions, it is of significance that with this construction each individual one of the plate portions 35 is directly connected with the bus bar 34. The embodiment of our invention which is illustrated in FIG. 3 presents the advantage of situating the paths through which the induced current flows in the opposed, oppositely oriented directions very close to each other. As a result this particular embodiment achieves an outstanding compensation of the transverse magnetic fields where they substantially fully cancel each other out. The return conductors 32 are of course made of superconductive material having a higher critical magnetic field than the material of the plate 31. Moreover, these conductors 32 are insulated at their longitudinal side edges from the plate 31 in any suitable way.

Figure 4A:
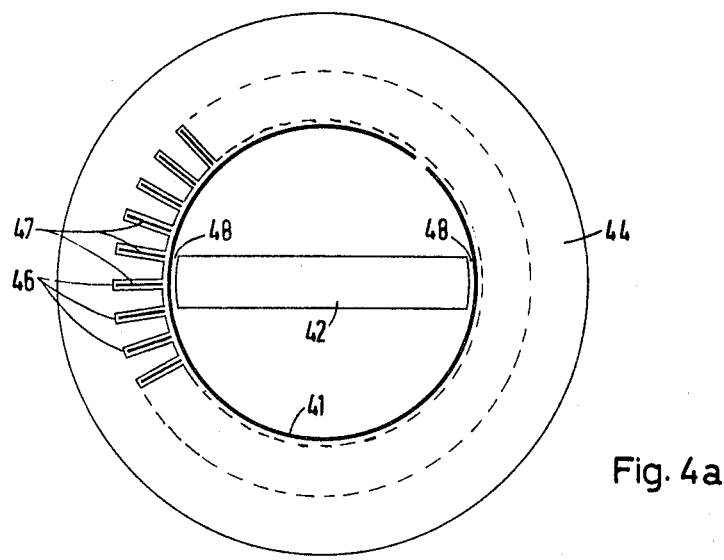
FIG. 4a shows schematically in transverse section one possible embodiment of a superconductive generator according to our invention.
Figure 4B:
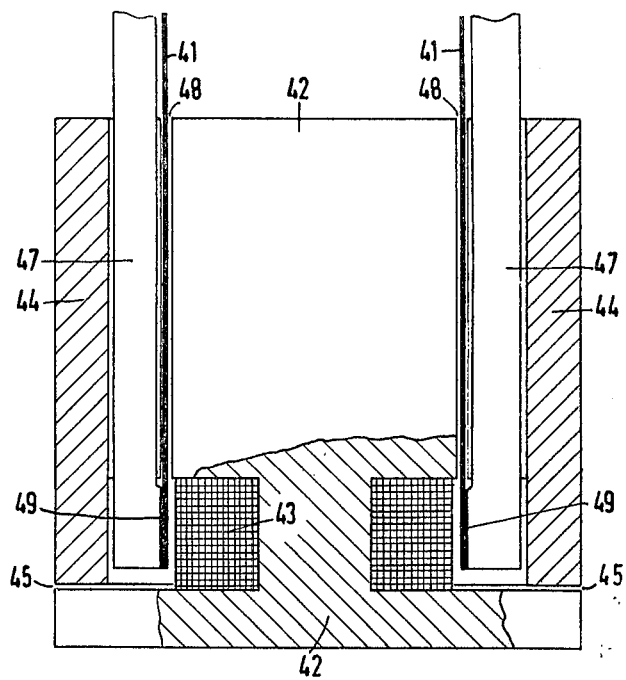
FIG. 4b shows the generator of FIG. 4a in a longitudinal sectional elevation.

FIGS. 4a and 4b show an embodiment of our invention where the structure is symmetrically arranged around a predetermined axis of symmetry and axis of rotation. The superconductive sheet 41 of this embodiment, through which the region of normal electrical conductivity moves, is composed of a sheet of superconductive material, such as niobium, for example, curved so as to have cylindrical configuration. The manner in which the sheet 41 is curved is particularly apparent from FIG. 4a. Within the cylinder 41 is situated a ferromagnetic body in the form of a plate 42 made, for example, of soft iron and arranged for rotary movement about the cylinder axis. The ferromagnetic body 42 is magnetized by a magnet coil 43. The magnetic circuit is closed by a hollow outer cylindrical casing 44 made of a ferromagnetic material such as soft iron, for example, and surrounding the cylinder-shaped superconductor 41. The plate 42 is separated from the hollow cylinder 44 by an air gap 45, so that the body 42 can rotate freely within the hollow cylinder 44.

The hollow outer cylindrical casing 44 is formed at its inner surface with elongated grooves 46 which are parallel to each other and parallel to the axis of the cylinder 41, and these grooves 46 respectively receive superconductive tapes 47 which form the return conductor means of this embodiment. These tapes 47 are arranged in the grooves 46 in such a way that the several bands or tapes 47 are respectively situated in planes which include the axis of the cylinder 41 and which extend radially therefrom, so that each tape 47 is in fact perpendicular to a tangent to the exterior surface of the cylinder 41 at the place where the particular band or tape 47 is located.

The superconductive tapes 47 are connected at their lower ends, as viewed in FIG. 4b, at the locations 49, with the superconductive cylinder 41, and the current which flows through the cylinder 41 will itself flow through the tapes 47 but in a direction oriented oppositely with respect to the direction of flow of the current in the cylinder 41.

Figure 5:
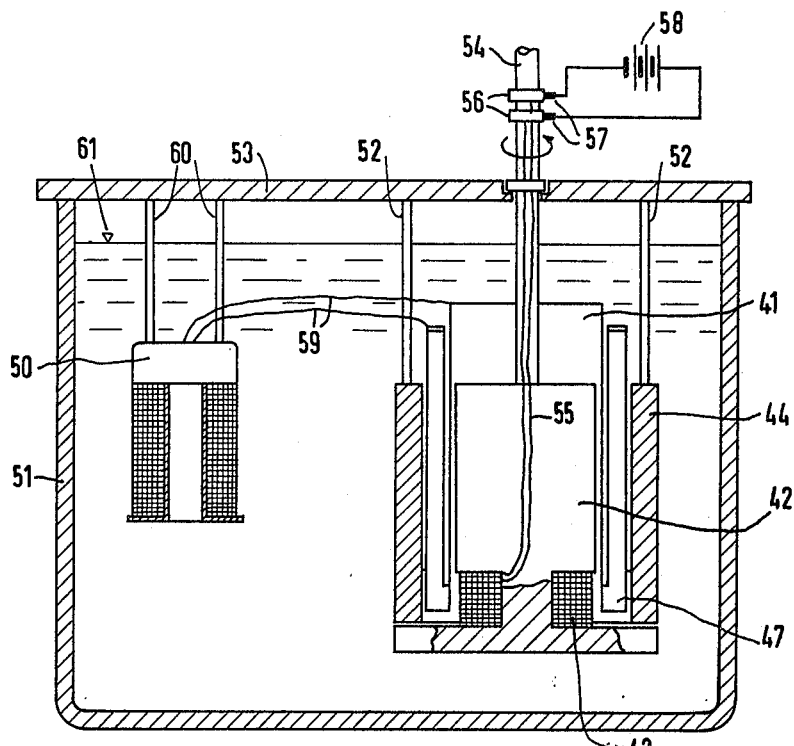
FIG. 5 schematically illustrates the operation of and components which coact with the generator of FIGS. 4a and 4b.

The opposite upper ends of the tapes 47 are connected into the electrical circuit in the manner shown in FIG. 5. Thus, referring to FIG. 5, it will be seen that the generator of FIG. 4 is situated together with a superconductive coil 50 which acts as a load in the interior of the cryostat 51. The hollow cylinder 44 of the generator is fixed to the cover 53 of the cryostat by means of supporting rods 52 of poor thermal conductivity. The ferromagnetic body 42, which has the configuration of a plate, as pointed out above, is connected with a shaft 54 supported for rotary movement in a suitable bearing carried by the cryostat cover 53. A suitable drive is operatively connected with the shaft 54 at the exterior of the cryostat so as to rotate the shaft 54 and thus also rotate the body 42.

The conductors 55 which are electrically connected with the coil 43 which serves to magnetize the body 42 extend along the shaft 54 to the exterior of the cryostat where they are electrically connected by slip rings 56, respectively, to a source of current 58. The current provided by the generator is directed through the superconducting conductors 59 to the superconductive coil 50. One of these conductors 59 extend from the coil 50 to a circular bus bar which engages all of the top ends of the bands or tapes 47, while the other conductor 59 extends from the coil 50 to the cylindrical superconductive sheet 41, as indicated in FIG. 5. The coil 50 is itself supported by rods 60 of poor thermal conductivity from the cover 53 of the cryostat. Liquid helium is situated in the cryostat and has the liquid surface 61 indicated in FIG.5.

During operation of this embodiment of a generator according to our invention, the plate 42 rotates about the axis of the cylinder. As a result there are provided in the pair of opposed air gaps 48 at the opposite side edges or end edges of the plate 42 a pair of normally conductive regions which because of the rotation of the body 42 move through the cylinder 41. Therefore a current is induced in the electrical circuit. The magnetic flux which flows through the pair of opposed normally conductive regions is primarily concentrated in those portions of the ferromagnetic outer cylindrical casing 44 which are situated between the tapes 47 and define between themselves the grooves 46 which receive the tapes, and these portions of the cylinder 44 are in the form of radialy extending ribs, shown most clearly in FIG. 4a, terminating at the inner surface of the body 44 in surfaces which limit the gaps 48, so that in this way the magnetic flux which flows through the normally conducting regions is concentrated and held distant from the bands 47 of superconductive material. These bands or tapes 47 are, therefore, during operation of the generator, exposed to a smaller magnetic field than the cylinder 41. The bands or tapes 47 therefore can be made of the same superconductive material as the cylinder 41, this material being, for example, also niobium.

In order to avoid any current losses, the sheet which is used for the cylinder 41 can be formed with slots which extend parallel to the axis of the cylinder. However, in order to assure a uniform current distribution in the cylinder and in the return conductor means, these slots preferably take the form of elongated grooves situated exclusively at the inner surface of the sheet 41, so that the edges of the sheet 41 are not interrupted by slots. Thus, these interior grooves which extend parallel to the axis of the cylinder do not extend all the way up to the edges of the sheet 41.

Of course, the superconductive sheet of our invention which is provided with the return conductor means of our invention can take many different forms. For example, the embodiments of FIGS. 2 and 3 can also have a cylindrical configuration. Furthermore, instead of providing a moving magnet pole in order to achieve the normally conductive region, it is possible to use a rotary magnetic field.

The particular arrangement of the return conductor means of our invention will depend upon the particular form of the superconductive generator and particularly upon the geometric configuration of the superconductive sheet. However, in all cases the return conductor means of our invention should be located as close to the superconductive sheet as the special construction of the generator permits. In addition it should be distributed as uniformly as possible with respect to the superconductive sheet. As a result of this arrangement the pair of electrical currents of equal intensity which flow in oppositely oriented directions through the super-conductive sheet and the return conductor means, respectively, will have practically the same volumetric distribution. Therefore, the magnetic fields resulting from these currents will, in the region surrounding the superconductive sheet and return conductor means, be of substantially the same magnitude while being directed oppositely with respect to each other, so that these fields substantially cancel each other.

The return conductor means of our invention must remain in the superconducting state during operation of the superconductive generator, and they should not revert to the normal conducting condition under the influence of the normally conductive region which moves through the superconductive sheet and which has the magnetic flux passing therethrough. If it should happen that the return conductor means also becomes partly normally conducting, there will be no current induced in the electrical circuit. Thus, in order to prevent the superconducting return conductor means of our invention from assuming a normal conducting condition during operation of the generator, the material which is used for the superconductive return conductor means of our invention has a critical magnetic field greater than the greatest magnetic field which occurs at the location of the return conductor means. Thus, the return conductor means can be made of a so-called hard superconductive material having a high critical magnetic field, such as niobium-zirconium or niobium-tin, while the superconductive sheet is made of a material of a lesser critical magnetic field, such as niobium or lead. Therefore, the normally conducting region produces a magnetic field which is situated between the critical magnetic fields of the materials used for the superconductive sheet and the superconductive return conductor means of our invention.

As was pointed out above in connection with FIGS. 4a and 4b, it is also possible to prevent the return conductor means from assuming a normal conducting condition by building the superconducting generator in such a way that the magnetic field at the location of the return conductor means is smaller than at the normal conducting region of the superconductive sheet. This result can be achieved by a suitable geometric arrangement of the return conductor means or by suitable conducting of the magnetic field, for example by situating ferromagnetic material in the region of the return conductor means, as described above in connection with FIGS. 4a and 4b. In this case the return conductor means and the superconductive sheet can be both be made of the same material, such as, niobium for example, as pointed out above.

We claim:

1. A superconductive generator comprising a superconductive sheet, means coacting with said sheet for moving through the latter a region of normal electrical conductivity through which magnetic flux flows, superconductive return conductor means located adjacent and coacting with said sheet during operation of the generator for receiving a current which flows in a direction oriented oppositely to the direction of flow of current in said sheet, so that transverse magnetic fields respectively resulting from the oppositely directed currents will substantially cancel each other, and ferromagnetic means situated in the vicinity of said return conductor means for guiding the magnetic flux and for maintaining the magnetic flux at the location of said return conductor means smaller than that at the region of normal electrical conductivity of said superconductive sheet.

2. A superconductive generator comprising a superconductive sheet, means coacting with said sheet for moving through the latter a region of normal electrical conductivity through which magnetic flux flows, and superconductive return conductor means located adjacent and coacting with said sheet during operation of the generator for receiving a current which flows in a direction oriented oppositely to the direction of flow of current in said sheet, so that transverse magnetic fields respectively resulting from the oppositely directed currents will substantially cancel each other, said return conductor means including a plurality of elongated parallel conductors extending along said sheet perpendicularly with respect to the direction of movement of said region of normal electrical conductivity.

3. A superconductive generator comprising a superconductive sheet, means coacting with said sheet for moving through the latter a region of normal electrical conductivity through which magnetic flux flows, said sheet having a plurality of parallel slots which extend perpendicularly with respect to the direction of movement of said region of normal electrical conductivity, and superconductive return conductor means located adjacent and coacting with said sheet during operation of the generator for receiving a current which flows in a direction oriented oppositely to the direction of flow of current in said sheet, so that transverse magnetic fields respectively resulting from the oppositely directed currents will substantially cancel each other, said return conductor means including a plurality of elongated conductors respectively situated in said slots and having a higher critical magnetic field than said sheet.

4. A superconductive generator comprising a superconductive sheet, means coacting with said sheet for moving through the latter a region of normal electrical conductivity through which magnetic flux flows, and superconductive return conductor means located adjacent and coacting with said sheet during operation of the generator for receiving a current which flows in a direction oriented oppositely to the direction of flow of current in said sheet, so that transverse magnetic fields respectively resulting from the oppositely directed currents will substantially cancel each other, said sheet being of cylindrical configuration and having a longitudinal axis, a ferromagnetic hollow cylinder surrounding said sheet and having an inner surface directed toward said sheet and formed with a plurality of parallel grooves which are parallel to the axis of said cylindrical sheet, said return conductor means including superconductive tapes which are respectively situated in said grooves and which are respectively situated in planes which include the axis of said cylindrical sheet and which extend radially therethrough, and means situated in the interior of said cylindrical sheet for providing a rotary magnetic field.

5. A superconductive generator for supplying electric energy to a load, said generator comprising a superconductive sheet, means coacting with said sheet for moving through the latter a region of normal electrical conductivity through which magnetic flux flows, and superconductive return conductor means located adjacent and coacting with said sheet during operation of the generator for receiving a current which flows in a direction oriented oppositely to the direction of flow of current in said sheet, so that transverse magnetic fields respectively resulting from the oppositely directed currents will substantially cancel each other said superconductive return conductor means including a plurality of return conductors uniformly distributed along said superconductive sheet, one end of each of said return conductors being connected to said sheet and the other end of each of said return conductors being connectable to the load.

References Cited

UNITED STATES PATENTS 3,402,307  9/1968  Pearl _____ 310—10

OTHER REFERENCES

Electrical Review, Jan. 3, 1964, p. 22.

DAVID X. SLINEY, Primary Examiner

U.S. Cl. X.R.

310—40